Figure 1:
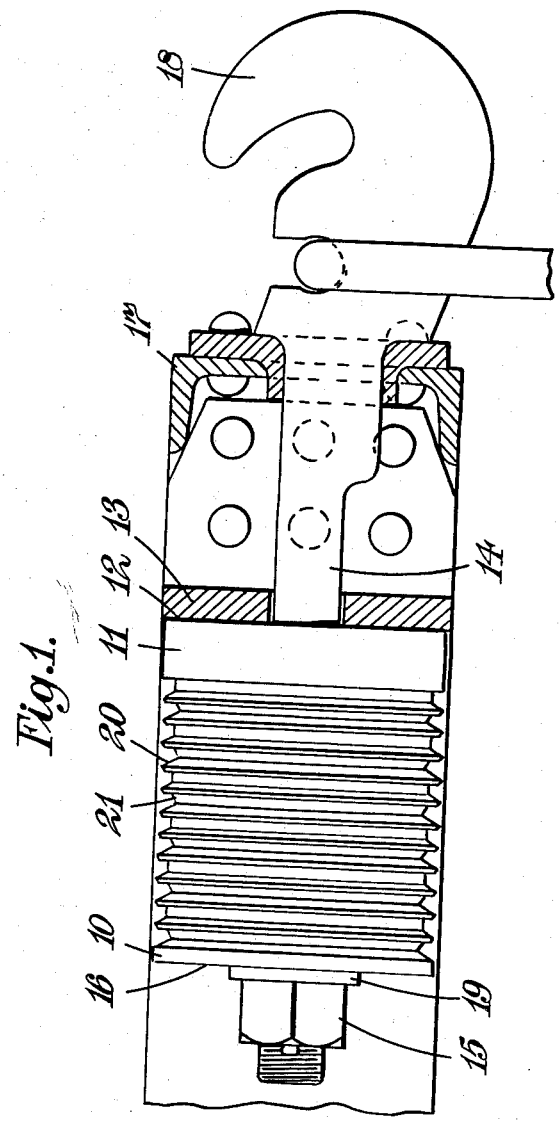

Dec. 17, 1963 W. R. BRAKE 3,114,540
RESILIENT UNITS
Filed Oct. 18, 1961
3 Sheets-Sheet 1

Dec. 17, 1963    W. R. BRAKE    3,114,540
RESILIENT UNITS
Filed Oct. 18, 1961    3 Sheets-Sheet 3

United States Patent Office 3,114,540
Patented Dec. 17, 1963

3,114,540
RESILIENT UNITS
William Robert Brake, Burton-on-Trent, England, assignor to BTR Industries Limited, London, England, a British company
Filed Oct. 18, 1961, Ser. No. 145,838
Claims priority, application Great Britain Oct. 27, 1960
5 Claims. (Cl. 267—1)

The invention relates to resilient units of the kind embodying a stack of resilient pads of natural or synthetic rubber or like resilient material sandwiched between rigid members and members at the end of the stack for applying to the stack a compressive axial load. Such a unit may be used, for example, in a rail vehicle to absorb shocks applied through a draw-bar, in a buffer or a part of a resilient suspension for the vehicle body.

The present invention provides a unit of the above kind which is characterised in that the opposed surfaces of at least some of the rigid members which engage the pads are oblique to the axis of the stack, whereby under axial load a shear stress component is applied to the pads in addition to a direct compressive stress.

In a preferred form of the invention the said surfaces are of conical or frusto-conical form and coaxial with the stack.

It is also preferred that the pads are in the form of rings coaxial with the stack and there may be two or more concentric rings between each pair of opposed surfaces.

The pads may each be secured e.g. bonded, to one of the pair of opposed surfaces between which they are sandwiched. It is preferred that they are not positively secured to the other surface.

A further preferred feature is that the rings have the section of a trapezoid of which the opposed parallel sides engage the opposed surfaces aforesaid between which the rings are sandwiched. When the rings are secured (e.g. bonded) to one of the opposed surfaces, it is desirable that it is the longer of the parallel sides of the trapezoid which is so secured.

The other sides may converge from the secured side to the opposite side at angles such that in the case of a ring which is secured to the outside of a cone, the side which constitutes the outer circumference of the ring is substantially parallel to the axis or converges from the secured side towards the axis whereas the side which constitutes the inner circumference of the ring is substantially perpendicular to the secured side or makes an acute angle therewith, in the case of a ring which is secured to the inside of a cone, the reverse arrangement may be used, i.e. the inner surface of the ring may be parallel to the axis or diverge therefrom and the outer surface of the ring may be perpendicular to the bonded side or make an acute angle therewith.

Figure 2:
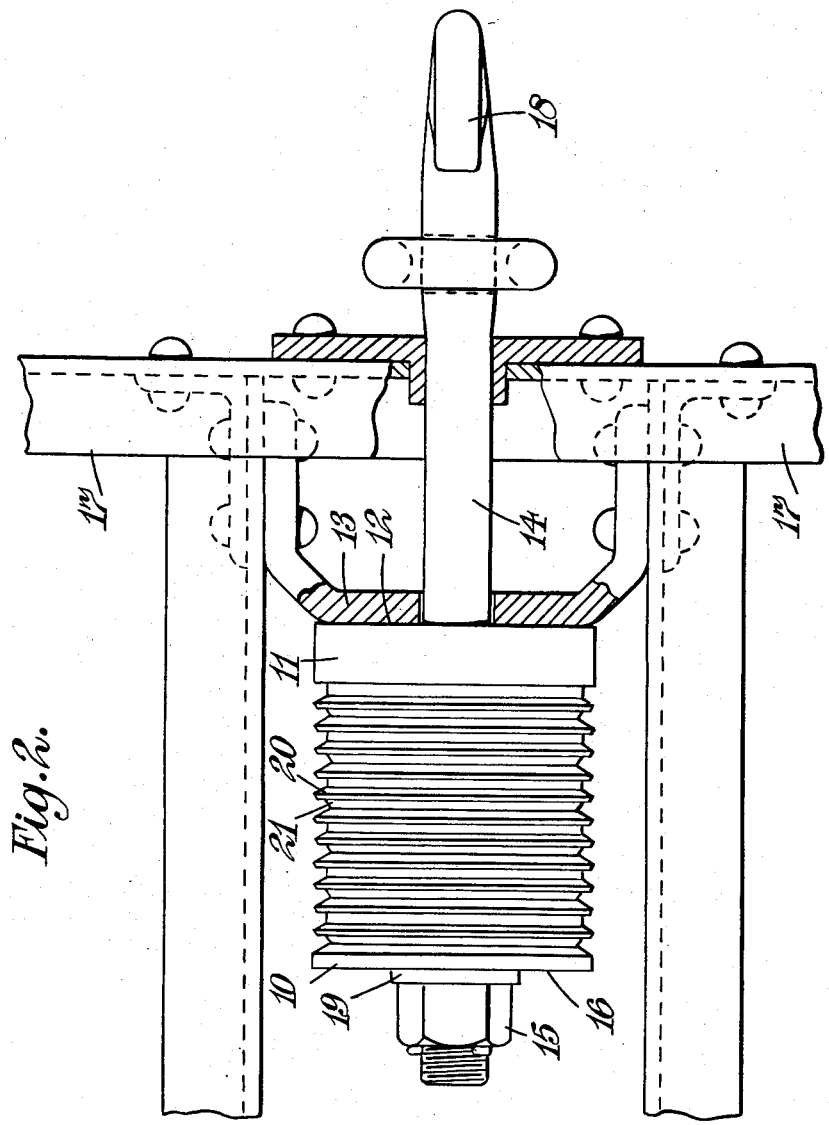
Figure 3:
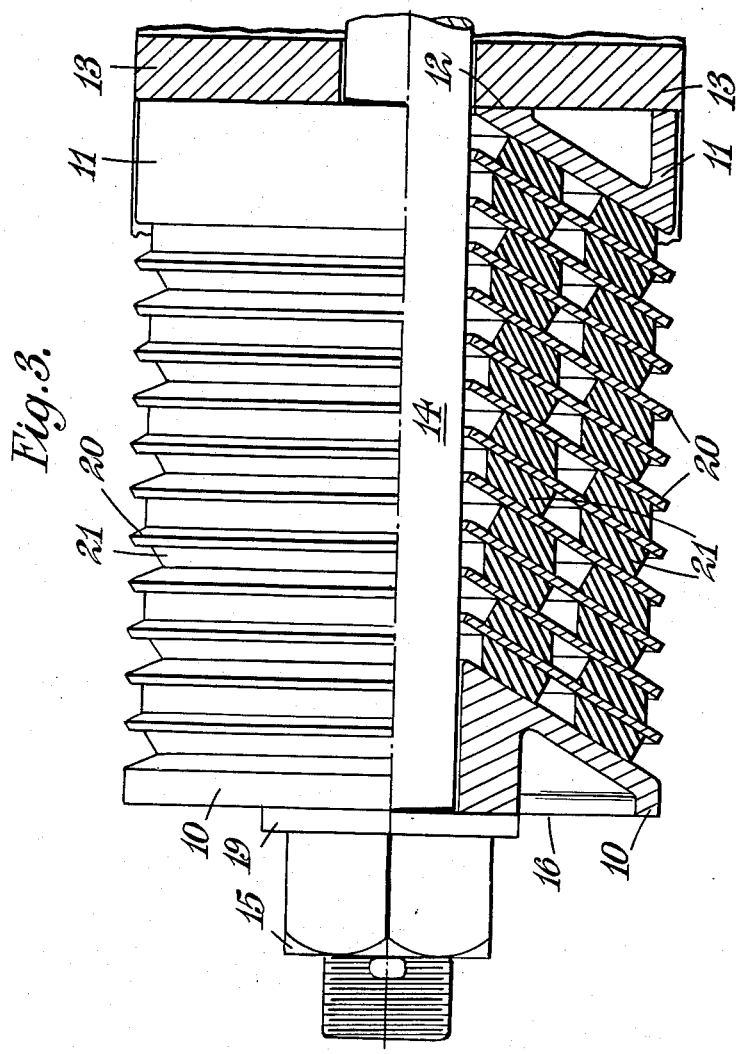

A specific construction of a resilient unit according to the invention embodied in a draw-gear for a rail vehicle, will now be described with reference to the accompanying drawings in which:

FIGURE 1 is a side view of the draw-gear,
FIGURE 2 is a plan view of the draw-gear, and
FIGURE 3 is a section on the centre line of the resilient unit of the draw-gear.

The unit forming the subject of the example comprises two complementary end members 10 and 11. Each end member is in the form of an annulus having one flat face and one frusto-conical face, the conical face on the member 11 being the outer side of an axial protuberance and the conical surface of the member 10 being provided by the side of an axial recess. The half angle of the cone is about 60°. The flat face 12 of the member 11 bears on the inside of a bracket 13 on a buffer beam 17. The shank 14 of a draw-hook 18 passes through the beam and bracket through this end member 11 and then through the other end member 10. A nut 15 on the end of the shank bears on a washer 19 and hence the flat face 16 of the other member.

Between the two end members there is a stack of rigid frusto-conical members 20 alternating with pads of rubber 21. There are, in this example, eleven rigid members 20 each in the form of a dished annular metal plate, the conical angle being the same as that of the end members. The pads 21 are constructed as rings of which there are two concentrically arranged between each pair of adjacent rigid members and between the end members and the adjacent rigid members. The rings 21 are bonded to the opposite faces of the two rigid members at the ends of the stack and to alternate intermediate rigid members, the intervening members being plain. The rings are of the sections already described.

In use an endwise pull applied to the draw-hook 18 compresses the stack between the two end members and applies both direct compression and shear forces to the rings 21.

The particular shape of the ring sections described above has various advantages, for example it avoids excessive rolling of the rubber or other elastomeric material on the rigid and end members during compression, it also ensures that the designed area in direct compression is maintained during deformation.

The invention is not limited to the detailed features above described nor to the particular uses mentioned. It may, for example, be applied to mountings for heavy machines. Further the rings are not necessarily secured to the plates by bonding. They may be secured by moulding into or through holes in the plates.

I claim:
1. A resilient unit of the type described comprising an assembly of a plurality of rigid members and annular elastomer pads disposed in alternation and in contacting relationship, said members being frusto-conical in configuration, and means to apply a load to said assembly including an end member having a frusto-conical outer surface on an axial protuberance engaged in the frusto-conical axial recess of the adjacent end of said assembly, an axial section through said pads being of trapezoidal configuration with the opposed parallel sides thereof engaging the opposed surfaces of the said members with which the pads alternate and with the sides of each of said pads other than the parallel sides converging from the secured side at angles such that, for a pad which is secured to the outer side of a rigid member, the side of the pad which constitutes the outer circumference thereof is substantially parallel to the axis of the unit whereas the side which constitutes the inner circumference of the pad makes an angle with the secured side which is not greater than a right angle.

2. A resilient unit as defined in claim 1 in which each pad secured to the inner side of a rigid member has the inner circumference of the pad substantially parallel to the axis of the assembly while the outer circumference of the pad makes an angle with the secured side which is not greater than a right angle.

3. A resilient unit as defined in claim 1 in which the said parallel sides of each of the pads are of different lengths and the longer of the two parallel sides is secured to one of said opposed surfaces.

4. A resilient unit as defined in claim 1 in which the means for applying the load to the assembly includes a member extending through the center of the assembly and connected to the said end member having the protuberance engaged in the axial recess of the adjacent end of the assembly.

5. A resilient unit as defined in claim 1 wherein there are two of said annular pads disposed in radially spaced concentric relationship between each pair of opposed surfaces of the said rigid members.

References Cited in the file of this patent

UNITED STATES PATENTS

| | | |
|---|---|---|
| 2,445,723 | Brown | July 20, 1948 |
| 2,573,108 | Piron | Oct. 30, 1951 |
| 2,590,033 | Piron | Mar. 18, 1952 |
| 2,776,759 | Campbell | Jan. 8, 1957 |

FOREIGN PATENTS

| | | |
|---|---|---|
| 432,304 | Great Britain | July 24, 1935 |